United States Patent
Kim et al.

(10) Patent No.: US 11,993,516 B2
(45) Date of Patent: May 28, 2024

(54) SYSTEM AND METHOD FOR PRODUCING CARBON NANOTUBES

(71) Applicant: LG CHEM, LTD., Seoul (KR)

(72) Inventors: Yon Jee Kim, Daejeon (KR); Kwang Woo Yoon, Daejeon (KR); Og Sin Kim, Daejeon (KR); Se Hyun Kim, Daejeon (KR); Seung Yong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 38 days.

(21) Appl. No.: 17/626,781

(22) PCT Filed: Nov. 30, 2020

(86) PCT No.: PCT/KR2020/017265
§ 371 (c)(1),
(2) Date: Jan. 12, 2022

(87) PCT Pub. No.: WO2021/112511
PCT Pub. Date: Jun. 10, 2021

(65) Prior Publication Data
US 2022/0289574 A1 Sep. 15, 2022

(30) Foreign Application Priority Data

Dec. 6, 2019 (KR) .......................... 10-2019-0162056

(51) Int. Cl.
*C01B 32/16* (2017.01)
*B01J 8/00* (2006.01)
(Continued)

(52) U.S. Cl.
CPC .............. *C01B 32/16* (2017.08); *B01J 8/005* (2013.01); *B01J 8/1809* (2013.01); *B01J 8/1863* (2013.01);
(Continued)

(58) Field of Classification Search
CPC . C01B 32/16; C01B 2202/26; C01B 2202/36; C01B 32/172; B01J 8/005;
(Continued)

(56) References Cited

U.S. PATENT DOCUMENTS

2005/0042162 A1 * 2/2005 Resasco ............... D01F 9/1272
423/447.3
2011/0085961 A1 4/2011 Noda et al.
(Continued)

FOREIGN PATENT DOCUMENTS

CN 101959793 A 1/2011
JP 2003-342840 A 12/2003
(Continued)

OTHER PUBLICATIONS

Definition of 'predetermine,' accessed online at https://www.merriam-webster.com/dictionary/predetermined on Jul. 1, 2023 (Year: 2023).*
(Continued)

*Primary Examiner* — Daniel C. McCracken
(74) *Attorney, Agent, or Firm* — BRYAN CAVE LEIGHTON PAISNER LLP

(57) ABSTRACT

In the present invention, only low-growth carbon nanotubes are selectively separated among solid particles discharged during a reaction and then re-input to a reactor, so that it is possible to improve the quality of a carbon nanotube product to be produced and the productivity of a carbon nanotube production process.

8 Claims, 1 Drawing Sheet

(51) Int. Cl.
*B01J 8/18* (2006.01)
*B82Y 40/00* (2011.01)

(52) U.S. Cl.
CPC ............ *B01J 8/1872* (2013.01); *B82Y 40/00* (2013.01); *B01J 2219/0031* (2013.01); *C01B 2202/26* (2013.01); *C01B 2202/36* (2013.01)

(58) Field of Classification Search
CPC ...... B01J 8/1809; B01J 8/1863; B01J 8/1872; B01J 2219/0031; B01J 8/006; B01J 8/1827; B01J 8/24; B01J 2219/00029; B01J 2219/00031; B82Y 40/00; B82Y 30/00

See application file for complete search history.

(56) References Cited

U.S. PATENT DOCUMENTS

| | | | |
|---|---|---|---|
| 2011/0158892 A1* | 6/2011 | Yamaki | B82Y 30/00 422/139 |
| 2014/0086820 A1 | 3/2014 | Nakamura et al. | |
| 2015/0158001 A1 | 6/2015 | Nakamura et al. | |
| 2018/0002178 A1 | 1/2018 | Yoon et al. | |

FOREIGN PATENT DOCUMENTS

| | | |
|---|---|---|
| JP | 2010-030887 A | 2/2010 |
| JP | 2010-173889 A | 8/2010 |
| JP | 2012-236727 A | 12/2012 |
| KR | 10-2009-0029956 A | 3/2009 |
| KR | 2009-0073346 A | 7/2009 |
| KR | 10-2010-0073149 A | 7/2010 |
| KR | 10-2011-0027715 A | 3/2011 |
| KR | 10-2014-0007195 A | 1/2014 |
| KR | 10-2014-0007197 A | 1/2014 |
| KR | 10-2014-0129639 A | 11/2014 |
| KR | 10-1487975 B1 | 1/2015 |
| KR | 10-1545384 B1 | 8/2015 |
| KR | 10-2016-0109039 A | 9/2016 |
| WO | 2016-144092 A1 | 9/2016 |

OTHER PUBLICATIONS

Definition of "reference," accessed online at https://www.merriam-webster.com/dictionary/reference on Jan. 11, 2024. (Year: 2024).*
Sato, et al., Growth of diameter-controlled carbon nanotubes using monodisperse nickel nanoparticles obtained with a differential mobility analyzer, Chemical Physics Letters 2003; 382: 361-366 (Year: 2003).*

* cited by examiner

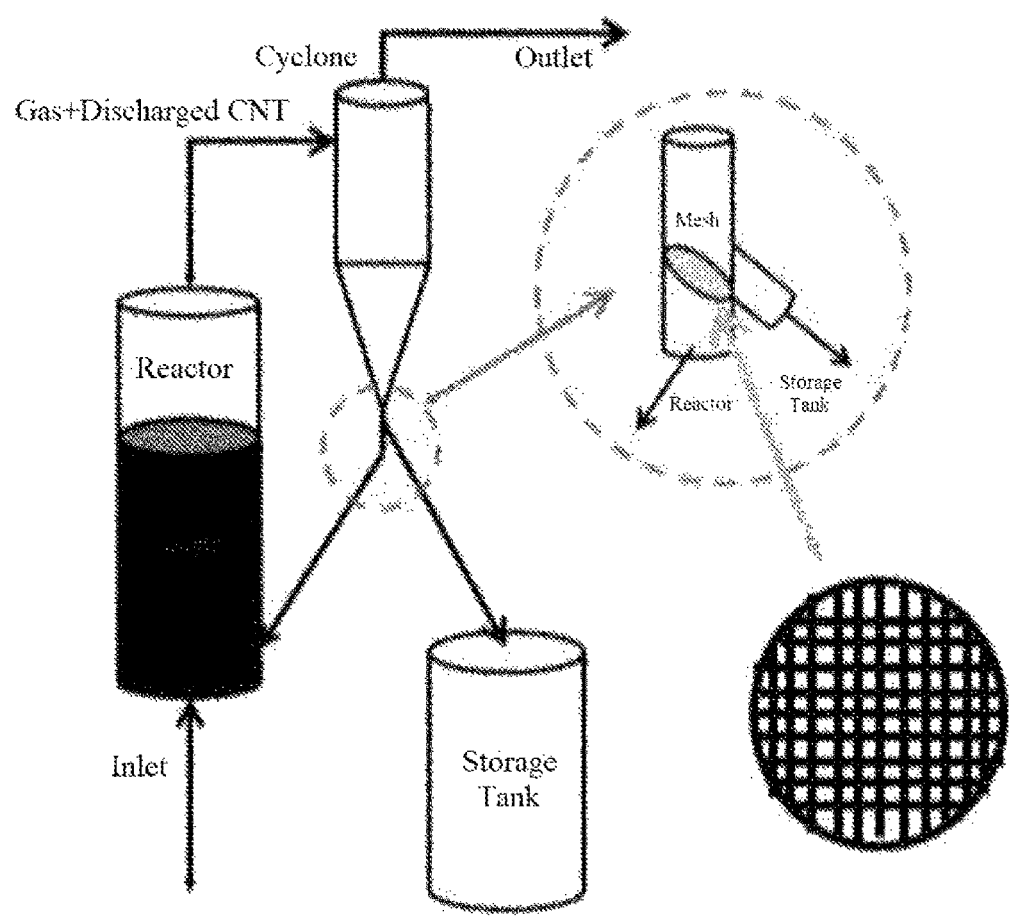

ately-grown carbon nanotubes as a final product.
SYSTEM AND METHOD FOR PRODUCING CARBON NANOTUBES This application is a National Phase entry of International Application No. PCT/KR2020/017265 filed on Nov. 30, 2020, and claims priority to and the benefit of Korean Patent Application No. 10-2019-0162056, filed on Dec. 6, 2019, in the Korean Intellectual Property Office, the disclosures of which are incorporated herein in its entirety by reference.

FIELD

The present invention relates to a system and a method for producing carbon nanotubes, wherein the system and the method are capable of producing carbon nanotubes efficiently and economically.

BACKGROUND

Carbon nano materials may be divided into fullerene, carbon nanotubes (CNT), graphene, graphite nano plates, and the like according to the shape of a material. Among these, carbon nanotubes are macromolecules in which the surface of a hexagonal honeycomb-shaped graphite in which one carbon atom is bonded to three other carbon atoms is roundly rolled to a nano-sized diameter.

Carbon nanotubes are hollow, and thus, are lightweight, and have electrical conductivity as good as copper, thermal conductivity as excellent as diamond, and tensile strength as good as steel. According to the rolled-shape thereof, carbon nanotubes may be divided into single-walled carbon nanotubes (SWCNT), multi-walled carbon nanotubes (MWCNT), and rope carbon nanotubes.

Due to excellent physical properties thereof, the carbon nanotubes are getting the spotlight as a filler for various polymer composite materials such as antistatic polymer composite materials, electromagnetic wave shielding polymer composite materials, heat dissipating polymer composite materials, high-strength polymer composite materials, and the like. In order to commercialize a polymer composite material using carbon nanotubes, a lot of research and development are under way.

Meanwhile, carbon nanotubes have been typically synthesized with a fluidized bed reactor, in which case the amount of carbon nanotubes participating in an actual reaction is reduced due to a gas and the like containing low-growth carbon nanotubes continuously generated and discharged during the reaction. So there has been a problem in that the efficiency of producing carbon nanotubes is poor. When a separation unit for collecting low-growth carbon nanotubes is installed inside the reactor in order to solve the problem, there is a problem of powder deposition and corrosion due to the structure of the separation unit. In addition, when a separation unit is installed outside to continuously circulate separated particles into the reactor, low-growth carbon nanotubes are present in a final product as impurities, so that there is a problem in that product quality may not be consistent.

Prior Art (Patent Document 1) KR 10-1487975
Prior Art (Patent Document 2) PCT/KR2016/002342

SUMMARY

An aspect of the present invention provides a system and a method for producing carbon nanotubes, the system and the method capable of improving productivity by collecting carbon nanotubes which are in the form of solid particles discharged out of a fluidized bed reactor during a reaction, and then separating the collected carbon nanotubes according to the size thereof, followed by moving low-growth carbon nanotubes among the separated carbon nanotubes into the fluidized bed reactor to further react the low-growth carbon nanotubes, and obtaining sufficiently-grown carbon nanotubes as a final product.

According to an aspect of the present invention, there is provided a system for producing carbon nanotubes, the system including a fluidized bed reactor provided with the internal space in which a carbon nanotube synthesis reaction is performed and a discharge unit for discharging a mixed gas containing solid particles, a separation unit for receiving the mixed gas connected to the discharge unit and for separating the solid particles in the mixed gas according to the particle diameter thereof, and a re-input unit for re-inputting carbon nanotubes having a particle diameter of equal to or less than a reference particle diameter among the particles separated at the separation unit to the fluidized bed reactor.

According to another aspect of the present invention, there is provided a method for producing carbon nanotubes, the method including (S1) reacting a catalyst and a reaction gas containing a carbon source gas and a flowing gas in a fluidized bed reactor to obtain carbon nanotube solid particles, (S2) collecting a mixed gas discharged out of the reactor during Step S1 into a separation unit provided outside the fluidized bed reactor and separating the solid particles in the mixed gas, and (S3) separating the separated solid particles according to the size thereof, and re-inputting particles having a particle diameter of equal to or less than a reference particle diameter to the fluidized bed reactor and obtaining particles having a particle diameter of greater than the reference particle diameter as a product, wherein the reference particle diameter is 50-500 µm, and the bulk density of the solid particles separated in Step S2 is 20 kg/m³ or less.

When a production system and a production method of the present invention are used, it is possible to reduce the content of low-growth carbon nanotubes in finally obtained carbon nanotubes, so that it is possible to obtain carbon nanotubes having excellent quality, and to produce carbon nanotubes efficiently by using the low-growth carbon nanotubes again as a reaction raw material.

BRIEF DESCRIPTION OF THE DRAWING

The following drawing attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic illustration of a simplified system for producing carbon nanotubes of the present invention.

DETAILED DESCRIPTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

System for Producing Carbon Nanotubes

Carbon nanotubes are typically produced using a fluidized bed reactor. Specifically, various particles containing low-growth carbon nanotubes and normal-growth carbon nanotubes are used as a bed in a fluidized bed reactor, and a separate carbon source gas, a catalyst, and the like are input into the fluidized bed reactor and reacted to produce carbon nanotubes. Meanwhile, when carbon nanotubes are produced using such a system for producing carbon nanotubes, due to the nature of a fluidized bed reactor, there is a problem in that the bed particles or carbon nanotube particles synthesized during a reaction process are continuously discharged out of the reactor during the reaction.

Particularly, since the bulk density of carbon nanotubes is low compared to that of catalyst particles used together, carbon nanotube particles are relatively more easily discharged, and among the carbon nanotubes, low-growth carbon nanotube particles of a low density which are produced by explosive volume growth at an early stage of the reaction are particularly discharged more readily. In this case, the amount of discharged carbon nanotubes is equivalent to about 5 to 7 wt % of the amount of finally produced carbon nanotubes, and this may worsen the economic feasibility of the overall process.

In a typical system for producing carbon nanotubes using a fluidized bed reactor, such carbon nanotube particles continuously discharged during a reaction are collected through a separate separation unit and are obtained together as a final product, wherein low-growth carbon nanotubes discharged in a large amount have not sufficiently grown, and thus, have a high content of impurities, so that a desired level of physical properties is not often achieved. Therefore, it is an important technical task at present to reduce the content of low-growth carbon nanotubes contained in a final product.

Taking into consideration that low-growth carbon nanotubes are discharged in a large amount at an early stage of a reaction, a typical technique has been proposed to achieve the above task by discarding particles collected at the early stage and selectively commercializing only the carbon nanotubes produced at a later stage of the reaction. However, the technique has a problem of worsening the productivity of the overall process by discarding low-growth carbon nanotubes, which are recyclable, instead of using the same, thereby causing the loss of a reaction raw material, and a problem of worsening quality in that although in a small amount when compared to the early stage of the reaction, low-growth carbon nanotubes are still produced at the later stage of the reaction.

Another solution proposed is to collect particles including low-growth carbon nanotubes discharged out of a reactor during a reaction, and then use all the particles as a bed for a subsequent reaction or re-input the same into the reactor. In this case, since sufficiently grown normal-growth carbon nanotubes are also recycled together, unnecessary energy is consumed, and rather, there is a problem in that the residence time of the normal-growth carbon nanotubes in a fluidized bed reactor becomes too long, which may cause the physical properties of the normal-growth carbon nanotubes to be degraded.

Therefore, there is a need to solve the problem of the aforementioned typical techniques. In order to solve the above problems, inventors of the present invention have invented the system and the method for producing carbon nanotubes in which solid particles discharged during a reaction are all collected and separated according to the size thereof, and then only the particles corresponding to low-growth carbon nanotubes are selectively re-input into a reactor. As described above, only the particles corresponding to low-growth carbon nanotubes are selectively re-input in the present invention, so that there are advantages in that it is possible to achieve excellent physical properties by reducing the content of the low-growth carbon nanotubes in a final product and to produce carbon nanotubes efficiently by reducing the amount of energy which may be unnecessarily consumed when normal-growth carbon nanotubes are re-input into a reactor.

Specifically, as shown in FIG. 1, the present invention provides a system for producing carbon nanotubes, the system including a fluidized bed reactor provided with the internal space in which a carbon nanotube synthesis reaction is performed and a discharge unit for discharging a mixed gas containing solid particles, a separation unit for receiving the mixed gas connected to the discharge unit and for separating the solid particles in the mixed gas according to the particle diameter thereof, and a re-input unit for re-inputting carbon nanotubes having a particle diameter of equal to or less than a reference particle diameter among the particles separated at the separation unit to the fluidized bed reactor.

In the above system, the fluidized bed reactor is where synthesis of carbon nanotubes is performed, and is not particularly limited as long as it is a fluidized bed reactor known to be used for the synthesis of carbon nanotubes. For example, the fluidized bed reactor may be provided with the internal space in which a carbon nanotube synthesis reaction is performed and a discharge unit for discharging a mixed gas containing solid particles, or may be provided with a catalyst input unit for inputting a catalyst and a gas input unit for inputting a carbon source gas corresponding to a reaction raw material and a flowing gas for imparting fluidity, and if necessary, a reducing gas as well.

The shape of each of the catalyst input unit, the gas input unit, and the discharge unit is not particularly limited as long as it allows each unit to smoothly perform the role thereof, and may be, for example, in the shape of a transfer pipe. Meanwhile, due to the nature of a fluidized bed reactor, it is preferable that the catalyst input unit and the gas input unit are provided at a lower portion of the fluidized bed reactor, and it is preferable that the discharge unit is provided at an upper portion of the fluidized bed reactor. Particularly, when the discharge unit is positioned at the upper portion, there is a technical advantage in that it is possible to selectively and smoothly discharge low-growth carbon nanotubes which are relatively lightweight.

A dispersion plate may be provided in the internal space of the fluidized bed reactor. The carbon source gas and the flowing gas, or the reducing gas input through the gas input unit are passed through the dispersion plate and then come into contact with the catalyst to form carbon nanotubes on a surface of the catalyst. The shape of the dispersion plate is not particularly limited as long as it may be applied to a fluidized bed reactor, and due to the function thereof, it is preferable that the dispersion plate is positioned higher than the gas input unit.

The separation unit in the system is to receive a mixed gas discharged from the above-described fluidized bed reactor and to separate solid particles in the mixed gas according to the size, specifically, the particle diameter thereof. In the present invention, the separation unit may be positioned outside the fluidized bed reactor and connected to the fluidized bed reactor by equipment such as a transfer pipe. It is possible to consider that the separation unit is positioned inside the fluidized bed reactor, so that a portion of the internal space of the fluidized bed reactor serves as the separation unit without separate equipment such as a transfer pipe. However, when the separation unit is positioned inside the fluidized bed reactor, the structure of the separation unit may prevent the formation of carbon nanotubes. Particularly, when it is considered that there may be a problem in that carbon nanotube particles formed are deposited on the structure of the separation unit and cause corrosion, it is preferable that the separation unit is positioned outside of the fluidized bed reactor.

The separation unit of the present invention may come in various shapes and types, and is not particularly limited as long as it can separate solid particles from a mixed gas and separate the separated solid particles according to the particle diameter thereof. For example, the separation unit may perform the function of separating solid particles from a mixed gas, and may include a cyclone. When the separation unit of the present invention includes a cyclone, the separation unit has excellent performance of separating solid particles from a mixed gas, and there is an advantage in that process operation is facilitated.

In addition, the separation unit of the present invention may separate solid particles based on a reference particle diameter. The solid particles in the mixed gas may be separated in the internal space of the separation unit without a separate apparatus due to a difference in density between the particles and the gas. However, low-growth carbon nanotubes and normal-growth carbon nanotubes have a relatively similar density and thus, should be separated through a separate separation apparatus. Since there is a difference in particle diameter between the low-growth carbon nanotubes and the normal-growth carbon nanotubes, the separation unit should be able to separate the solid particles based on a reference particle diameter.

The separation unit is not particularly limited as long as it can separate solid particles based on a particle diameter. For example, the separation unit may include a filter whose pore diameter is the reference particle diameter. When the separation unit includes a filter, it is possible to easily separate solid particles having a particle diameter larger than the reference particle diameter and solid particles having a particle diameter smaller than the reference particle diameter by using only gravity without a separate operation. More specifically, when a filter is applied as the separation unit, particles having a particle diameter smaller than the reference particle diameter pass through the filter, but particles having a particle diameter larger than the reference particle diameter do not pass through the filter, so that only the low-growth carbon nanotubes may be selectively re-input through the re-input unit thereafter. Meanwhile, the separation unit may be positioned lower than the discharge unit of the fluidized bed reactor. When the separation unit is positioned lower than the discharge unit of the fluidized bed reactor, the solid particles in the mixed gas introduced from the discharge unit may be separated from the gas naturally due to a difference in density.

The re-input unit is to input only the low-growth carbon nanotubes having a small particle diameter among carbon nanotubes separated at the separation unit back into the fluidized bed reactor. The re-input unit may be provided with a space for storing the low-growth carbon nanotubes separated at the separation unit, or may be provided with a transfer apparatus for transferring stored solid particles into the reactor. The transfer apparatus may be applied without particular limitation as long as it is known to be used for transferring powder form.

The carbon nanotube production system provided by the present invention may be operated continuously or batchwise. When the production system is operated continuously, the low-growth carbon nanotubes separated at the separation unit may be continuously re-input through the re-input unit, and the normal-growth carbon nanotubes may be either continuously discharged from the separation unit and stored or commercialized immediately. Meanwhile, when the production system is operated batchwise, the low-growth carbon nanotubes separated at the separation unit may be stored at a storage space of the re-input unit and then re-input into a reactor before the following reaction cycle and used as a bed or the like.

Method for Producing Carbon Nanotubes

The present invention provides a method for producing carbon nanotubes, which may be implemented through the above-described system for producing carbon nanotubes. Specifically, the present invention provides a method for producing carbon nanotubes, the method including (S1) reacting a catalyst and a reaction gas containing a carbon source gas and a flowing gas in a fluidized bed reactor to obtain carbon nanotube solid particles, (S2) collecting a mixed gas discharged out of the reactor during Step S1 into a separation unit provided outside the fluidized bed reactor and separating the solid particles in the mixed gas, and (S3) separating the separated solid particles according to the size thereof, and re-inputting particles having a particle diameter of equal to or less than a reference particle diameter to the fluidized bed reactor and obtaining particles having a particle diameter of greater than the reference particle diameter as a product, wherein the reference particle diameter is 50 to 500 μm, and the bulk density of the solid particles separated in Step S2 is 20 kg/m3 or less.

Step S1 in the production method of the present invention is a step of reacting a carbon source gas using a fluidized bed reactor in the presence of a catalyst, thereby producing carbon nanotubes. The present step is a step of producing carbon nanotubes through a fluidized bed reactor as in the prior art. In addition to those to be described below, any conditions may be applied to the present step without particular limitation as long as it may be applied to a reaction for producing carbon nanotubes through a fluidized bed reactor.

The catalyst may be used without particular limitation as long as it is known to be used for the production of carbon nanotubes in the present art. The catalyst may be a heterogeneous catalyst composed of a composite structure of an active metal and a carrier which may be typically used, and more specifically, may be a catalyst in the form of a supported catalyst or a co-precipitated catalyst.

When a supported catalyst is used as the catalyst, the supported catalyst has a higher bulk density than a co-precipitated catalyst, and unlike the co-precipitated catalyst, the supported catalyst has a small amount of fine particles of 10 microns or less, so that it is possible to suppress the agglomeration of the fine particles. Also, it is possible to reduce the possibility of the generation of fine particles caused by abrasion which may occur during a fluidization process, and the mechanical strength of the catalyst itself is excellent, so that there is an advantage in that the reactor may be operated stably.

Meanwhile, when a co-precipitated catalyst is used as the catalyst, the catalyst may be produced in a simple way, and prices of metal salts preferred as catalyst raw materials are low, so that it is advantageous in terms of production cost. Also, the co-precipitated catalyst has a large specific surface area, so that there is an advantage in that catalytic activity is high.

The carbon source gas is a carbon-containing gas which may be decomposed at a high temperature to form carbon nanotubes. Specific examples thereof may include various carbon-containing compounds such as aliphatic alkanes, aliphatic alkenes, aliphatic alkynes, aromatic compounds, and the like. More specifically, a compound of methane, ethane, ethylene, acetylene, ethanol, methanol, acetone, carbon monoxide, propane, butane, benzene, cyclohexane, propylene, butene, isobutene, toluene, xylene, cumene, ethylbenzene, naphthalene, phenanthrene, anthracene, acetylene, formaldehyde, acetaldehyde, and the like may be used.

Particularly, when methane, ethane, carbon monoxide, acetylene, ethylene, propylene, propane, butane or a liquefied petroleum gas (LPG) which is a mixture gas is used as the carbon source gas, it is easy to input the gas into the reactor, and it is also advantageous in terms of process economic feasibility.

The flowing gas used in the present step is to impart fluidity to carbon nanotubes to be synthesized, and any flowing gas may be used without limitation as long as it can impart fluidity without reacting with the carbon source gas. For example, an inert gas may be used, and specifically, nitrogen gas or argon gas may be used.

In the present step, the reaction gas containing a carbon source gas and a flowing gas may further contain a reducing gas. The reducing gas is a gas which may help the production of carbon nanotubes, and any gas may be used as long as it has reducibility. Specifically, hydrogen gas may be used.

The proportion of the carbon source gas in the reaction gas may be 0.1 to 0.5, preferably 0.15 to 0.3, and more preferably 0.15 to 0.25. When the ratio of the carbon source gas is lower or higher than the above, the carbon source gas is input in an amount smaller or larger than an amount required for the synthesis of carbon nanotubes, so that there is a carbon source gas not participating in the reaction, which causes a problem in that the overall efficiency and economic feasibility of the reaction are degraded.

In the present step, it is preferable that a reaction of the reaction gas is performed at a temperature of 600 to 750° C. When the temperature of the reaction is lower than the above, energy required for the production of carbon nanotubes is not sufficiently supplied. When higher than the above, thermal decomposition of a catalyst and the like occurs, so that the reaction may not performed smoothly.

In the present step, it is preferable that the reaction of the reaction gas is performed for 30 minutes to 2 hours. When the reaction duration is too short, there are problems in that low-growth carbon nanotubes are produced in a large amount, and carbon nanotubes having a desired length and diameter are not produced. When too long, there is a problem in that the efficiency of the overall reaction is degraded.

As long as it is a fluidized bed reactor typically used for the synthesis of carbon nanotubes, any fluidized bed reactor may be used without particular limitation as the fluidized bed reactor used in the present invention. Specifically, the fluidized bed reactor is provided with a dispersion plate at a lower portion and an expander at an upper portion, and may be provided with a gas input unit for inputting a catalyst and a reaction gas in the lower portion and a discharge unit for discharging a mixed gas containing produced carbon nanotubes in the upper portion.

Step S2 in the production method of the present invention is a step of collecting a mixed gas discharged out of the reactor during Step S1 into a separation unit provided outside the fluidized bed reactor and separating solid particles in the mixed gas. Due to the nature of a fluidized bed reactor which flows catalyst particles to react the same with a reaction raw material gas, among carbon nanotubes synthesized in Step S1, low-growth carbon nanotube particles having relatively low mass and density may be easily discharged out of the reactor in the form of a mixed gas with the flowing gas through the upper portion of the reactor, and in the present step, the mixed gas is collected through a separation unit provided outside the reactor, and then solid particles in the mixed gas are separated.

The solid particles separated in the present step are separated according to the size thereof in the following Step S3, and may be input back into the reactor when corresponding to low-growth carbon nanotubes, and may be finally commercialized when corresponding to normal-growth carbon nanotubes. The solid particles separated in the present S2 step may have a bulk density of 20 kg/m$^3$ or less, preferably 15 kg/m$^3$ or less. When the bulk density is higher than the above, the solid particles are relatively heavy, and thus, are less likely to be discharged out of the reactor during the reaction. In addition, when solid particles having a bulk density higher than the above range are re-input into the reactor, it means that carbon nanotubes which have already been sufficiently grown are re-input into the reactor. Therefore, the yield of a finally obtained product may be low, and the economic feasibility of a carbon nanotube production process may be reduced.

The separation unit in the present step is not particularly limited to particular shapes or types as long as it can separate solid particles present in a mixed gas. A cyclone may be frequently used. Solid particles separated through a cyclone are to be collected at a lower portion of the cyclone, and the remaining gases may be discharged through an upper portion thereof. The solid particles collected at the lower portion of the cyclone are separated according to the size thereof in the following Step S3. Normal-growth carbon nanotubes may be stored in a separate storage space to be commercialized, and low-growth carbon nanotubes may be re-input into the fluidized bed reactor during the reactor when if it is a continuous operation, or may be re-input into the fluidized bed reactor before the following reaction cycle if it is a batchwise operation.

Step S3 in the production method of the present invention is a step of separating the separated solid particles according to the size thereof, and re-inputting particles having a particle diameter of equal to or less than a reference particle diameter to the fluidized bed reactor and obtaining particles having a particle diameter of greater than the reference particle diameter as a product. As described above, the solid particles separated through the separation unit are then separated according to the size thereof, and low-growth carbon nanotubes having a particle diameter smaller than a reference particle diameter are used again as a reaction raw material and a bed of the reactor, and normal-growth carbon nanotubes having a particle diameter larger than the reference particle diameter are to be commercialized.

The reference particle diameter in the present step may be 50-500 μm, preferably 80-400 μm, and more preferably 100-300 μm. When the reference particle diameter is set to the above-described range, the distinction between the low-growth carbon nanotubes to be re-input and the normal-growth carbon nanotubes to be commercialized is clear, so that it is possible to ensure that the physical properties of a final product are excellent and that the productivity of the carbon nanotube production process is excellent.

Meanwhile, in order to perform the present step, the separation unit may include a filter whose pore size corresponds to the reference particle diameter.

The low-growth carbon nanotubes in the present step may be input continuously or batchwise. For example, when a reaction in which carbon nanotubes are synthesized is continuously performed and a mixed gas is continuously discharged, the low-growth carbon nanotubes at the separation unit may also be continuously re-input, and solid particles may be collected from the continuously discharged mixed gas and then separated before the start of the following reaction cycle to be re-input into the reactor.

Hereinafter, the present invention will be described in more detail with reference to Examples and Experimental Examples. However, the present invention is not limited by these Examples and Experimental Examples. Examples according to the present invention may be modified into other various forms, and the scope of the present invention should not be construed as being limited to the embodiments described below. Examples of the present invention are provided to more fully describe the present invention to those skilled in the art.

EXAMPLES

Example 1

Ethylene gas was used as a carbon source gas and nitrogen gas was used as a flowing gas, and of all the reaction gases to be input, the carbon source gas was input at a ratio of 0.2. In addition, as a catalyst, a Co-based supported catalyst was used as much as 1/24 of the mass of the ethylene gas to be input, and a reaction was performed by setting the reaction temperature to 670° C. and the reaction duration to 1 hour. Thereafter, solid particles in a mixed gas generated while performing the reaction were separated at a separation unit, and were passed through a filter having a pore size of 100 μm to continuously re-input low-growth carbon nanotube particles having a particle diameter of 100 μm into a reactor. Through the above process, carbon nanotubes were finally obtained.

Example 2

Carbon nanotubes were obtained in the same manner as in Example 1 except that the pore size of the filter was set to 300 μm.

Comparative Example 1

Carbon nanotubes were obtained in the same manner as in Example 1 except that the solid particles separated at the separation unit in the process of Example 1 were all discarded.

Comparative Example 2

Carbon nanotubes were obtained in the same manner as in Example 1 except that the solid particles separated at the separation unit in the process of Example 1 were all re-input into the reactor without being passed through the filter.

Comparative Example 3

Carbon nanotubes were obtained in the same manner as in Example 1 except that carbon nanotube particles having a bulk density of greater than 20 kg/m³ were input to the reactor instead of inputting the solid particles separated at the separation unit in the process of Example 1.

Experimental Example 1. Confirmation of Physical Properties of Solid Particles Separated at Separation Unit The solid particles separated at the separation unit in the process of Example 1 were separately taken, and the bulk density, specific surface area, and purity of the taken particles were measured. The measurement results are shown in Table 1 below.

The bulk density was calculated by filling up the obtained carbon nanotubes in a container having a volume of 35.37 ml and measuring the weight thereof, and then dividing the measured weight by the volume of the container.

The specific surface area was measured using a specific surface area meter of BELSORP Co., Ltd, and the purity was measured by the following method.

Purity: The obtained carbon nanotube powder was burned at 700° C., and then the weight of the remaining ash was measured. Then, the purity was calculated using the following equation. The purity refers to the content of carbon nanotubes, which are burnable, in the obtained carbon nanotube powder, and the remaining ash after the burning refers to a catalyst and the like other than the carbon nanotubes.

Purity=(Weight of carbon nanotube powder finally obtained−weight of ash)/Weight of carbon nanotube powder finally obtained*100%

TABLE 1

| | Bulk density (kg/m³) | Specific surface area (m²/g) | Purity (%) |
|---|---|---|---|
| Solid particles separated at separation unit in Example 1 | 18 | 220 | 95 |

From the results shown in Table 1 above, it was confirmed that particles discharged out of the reactor during a carbon nanotube synthesis reaction inside the fluidized bed reactor were discharged out of the reactor due to the relatively low bulk density of the particles.

Experimental Example 2. Confirmation of Physical Properties of Carbon Nanotubes Produced in Examples and Comparative Examples The bulk density, specific surface area, purity, and average particle diameter of the carbon nanotubes finally produced in Examples and Comparative Examples were confirmed, and the results are shown in Table 2 below.

Meanwhile, the average particle diameter was obtained by measuring the particle diameter of an individual carbon nanotube using a field emission scanning electron microscope, and then calculating an average value for a total of 300 particles.

TABLE 2

| | Bulk density (kg/m³) | Specific surface area (m²/g) | Purity (%) | Average diameter (nm) |
|---|---|---|---|---|
| Example 1 | 23 | 250 | 95 | 9 |
| Example 2 | 25 | 260 | 95 | 9 |
| Comparative Example 1 | 29 | 264 | 95 | 10 |
| Comparative Example 2 | 20 | 238 | 95 | 8 |
| Comparative Example 3 | 25 | 257 | 95 | 9 |

From the above results, it was confirmed that the carbon nanotubes produced in Examples of the present invention exhibited an appropriate bulk density, specific surface area, purity, and average diameter range. Meanwhile, it was confirmed that in the case of Comparative Example 1 in which the particles of the filter were not re-input, carbon nanotubes having a relatively high bulk density were produced and that in the case of Comparative Example 2 in which the particles of the filter were all re-input, carbon nanotubes having a low bulk density were produced.

Experimental Example 3. Confirmation of Electrical Resistance of Carbon Nanotubes Produced in Examples and Comparative Examples Carbon nanotubes produced in Examples and Comparative Examples were mixed in a content of 1.5 wt % with polycarbonate, and then injected into a composite material. The electrical resistance of the produced composite material was confirmed and is shown in Table 3 below. The electrical resistance was measured using a surface resistance meter of WOLFGANG WRMBIE Co., Ltd.

TABLE 3

| | Example 1 | Example 2 | Comparative Example 1 | Comparative Example 2 | Comparative Example 3 |
|---|---|---|---|---|---|
| Electrical resistance [ohm/sq.] | 9-10 | 9-10 | 10 | 10 | 10 |

From the results shown in Table 3 above, it was confirmed that a lower electrical resistance was exhibited in the present invention in which the particles discharged out of the reactor during the reaction were selectively re-input depending on the size of the particles than in a case in which the particles were all re-input or a case in which the particles were not re-input at all. In addition, it was also confirmed that Comparative Example 3 in which particles having a high bulk density were re-input exhibited a higher electrical resistance than Examples of the present invention. A low electrical resistance shows that the electrical properties of carbon nanotubes are excellent. Therefore, it was confirmed that carbon nanotubes produced by the production method of the present invention exhibited excellent electrical properties compared to carbon nanotubes produced by the production method of Comparative Examples.

The invention claimed is:

1. A system for producing carbon nanotubes, the system comprising:
    a fluidized bed reactor provided with an internal space in which a carbon nanotube synthesis reaction is performed and a discharge unit for discharging a mixed gas containing carbon nanotube solid particles;
    a separation unit for receiving the mixed gas containing the carbon nanotube solid particles connected to the discharge unit and for separating the carbon nanotube solid particles from the mixed gas, the separation unit comprises a filter having a pore diameter that corresponds to a reference particle diameter, wherein carbon nanotube solid particles having a particle diameter equal to or less than the reference particle diameter are separated from carbon nanotube solid particles having a particle diameter greater than the reference particle diameter; and
    a re-input unit for re-inputting the carbon nanotube solid particles having the particle diameter equal to or less than the reference particle diameter to the fluidized bed reactor.

2. The system of claim 1, wherein the discharge unit is provided on an upper portion of the fluidized bed reactor.

3. The system of claim 1, wherein the separation unit is positioned lower than the discharge unit of the fluidized bed reactor.

4. A method for producing carbon nanotubes, the method comprising:
    (S1) reacting a catalyst and a reaction gas containing a carbon source gas and a flowing gas in a fluidized bed reactor to obtain carbon nanotube solid particles;
    (S2) collecting a mixed gas containing the solid particles discharged out of the reactor during Step S1 into a separation unit provided outside the fluidized bed reactor and separating the carbon nanotube solid particles from the mixed gas; and
    (S3) separating the separated carbon nanotube solid particles according to the particle size thereof, wherein particles having a particle diameter equal to or less than a reference particle diameter are separated from carbon nanotube solid particles having a particle diameter greater than the reference particle diameter, and re-inputting the carbon nanotube solid particles having the particle diameter equal to or less than the reference particle diameter into the fluidized bed reactor and obtaining carbon nanotube solid particles having a particle diameter greater than the reference particle diameter as a product, wherein the reference particle diameter is 50 to 500 μm, and a bulk density of the solid particles separated in Step S2 is 20 kg/m³ or less.

5. The method of claim 4, wherein the predetermined reference particle diameter is 80-400 μm.

6. The method of claim 4, wherein the reaction gas further comprises a reducing gas.

7. The method of claim 4, wherein the reaction in Step S1 is performed at a temperature of 600 to 750° C.

8. The method of claim 4, wherein the reaction in Step S1 is performed for 30 minutes to 2 hours.

* * * * *